1,370,885.

DIFFUSING ELEMENT.
APPLICATION FILED NOV. 14, 1919.

Patented Mar. 8, 1921.
2 SHEETS—SHEET 1.

WITNESSES:

Charles W. Frederick
& Roy S. Hopkins,
INVENTORS,
BY Ray L. Stinchfield
Newton M. Persons
ATTORNEYS C. W. FREDERICK AND R. S. HOPKINS.
DIFFUSING ELEMENT.
APPLICATION FILED NOV. 14, 1919.
1,370,885.   Patented Mar. 8, 1921.
2 SHEETS—SHEET 2.
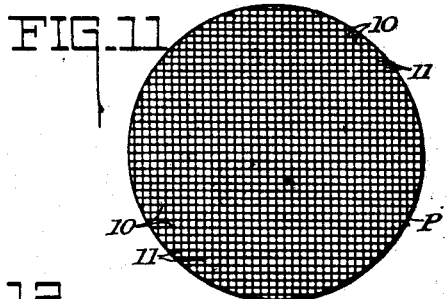
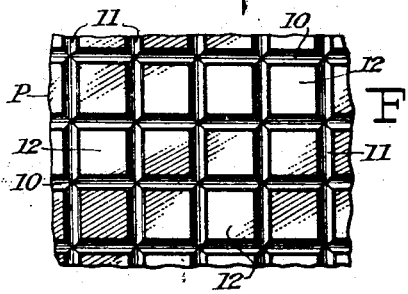
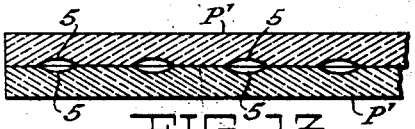
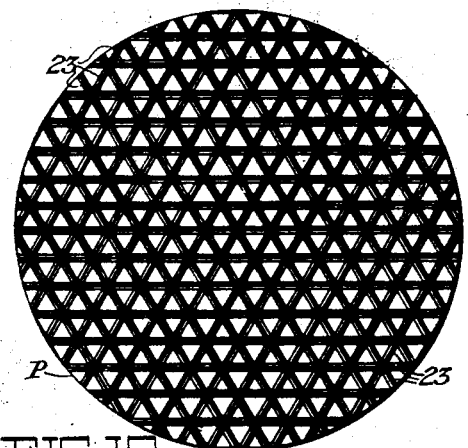
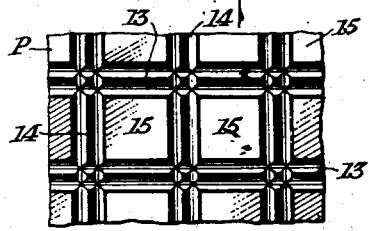
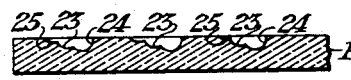
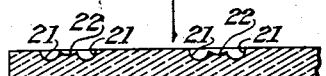
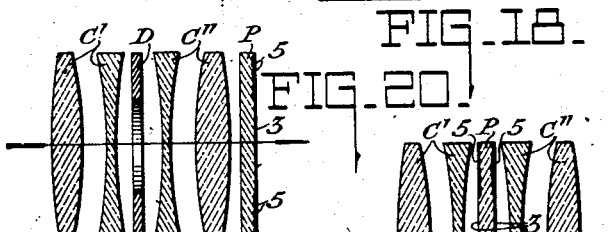
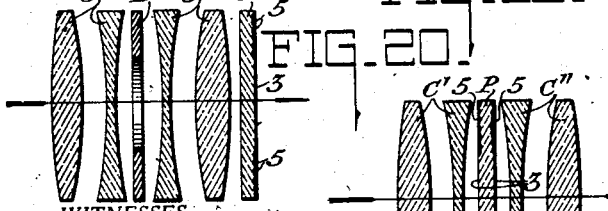
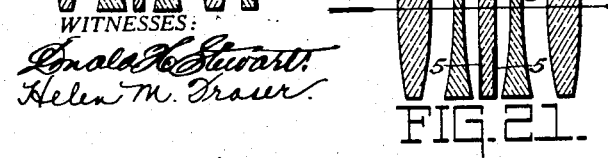
Charles W. Frederick
& Roy S. Hopkins,
INVENTORS,
Ray L. Stinchfield
BY Newton N. Simms
ATTORNEYS.

UNITED STATES PATENT OFFICE.

CHARLES W. FREDERICK AND ROY S. HOPKINS, OF ROCHESTER, NEW YORK, ASSIGNORS TO EASTMAN KODAK COMPANY, OF ROCHESTER, NEW YORK, A CORPORATION OF NEW YORK.

DIFFUSING ELEMENT.

1,370,885.    Specification of Letters Patent.    Patented Mar. 8, 1921.

Application filed November 14, 1919. Serial No. 338,007.

*To all whom it may concern:*

Be it known that we, CHARLES W. FREDERICK and ROY S. HOPKINS, citizens of the United States of America, residing at Rochester, in the county of Monroe and State of New York, have invented certain new and useful Improvements in Diffusing Elements, of which the following is a full, clear, and exact specification.

This invention relates to a diffusing element which will add to a well corrected objective such a degree of aberration as to produce an artistically diffused image.

The object of our invention is to make an element for this purpose which is extremely simple and compact, which may be cheaply and easily manufactured, which can be used to introduce a difinite and predetermined degree of aberration into a well corrected optical system, and which can be readily attached to and removed from such a system so that the same objective can be used for taking sharp and diffused images. Other objects will appear hereinafter.

The introduction of a certain amount of diffusion into photographic lenses has long been regarded as artistically desirable and has been attained by various methods such as by throwing the lens slightly out of focus, or interposing a screen that would give a general diffusion, or by the use of a lens that is imperfectly corrected for spherical aberration. We have found that any desired degree of aberration can be obtained by the use with a well corrected objective of a diffusing element in which a series of symmetrically arranged polished grooves have been made. These grooves may be formed in a very wide variety of patterns, and may differ in depth and radius of curvature. By the use of a series of these elements which can be cheaply and easily made, a single well corrected objective can be used for the production of sharp images and also images of various qualities, depending on the nature of the element used, and without the use of stops or screens that reduce the amount of transmitted light. In order to disclose our invention more clearly, reference will now be made to the appended drawings in which:

Fig. 10 is a section of one form of diffusing element;

Fig. 11 is a plan of still a different design of diffusing element;

Fig. 12 is an enlarged plan of a fragment of the form shown in Fig. 11;

Fig. 13 is a section of a form of diffusing element comprising two plates;

Fig. 14 is an enlarged plan of a fragment of a still different form;

Figure 1:
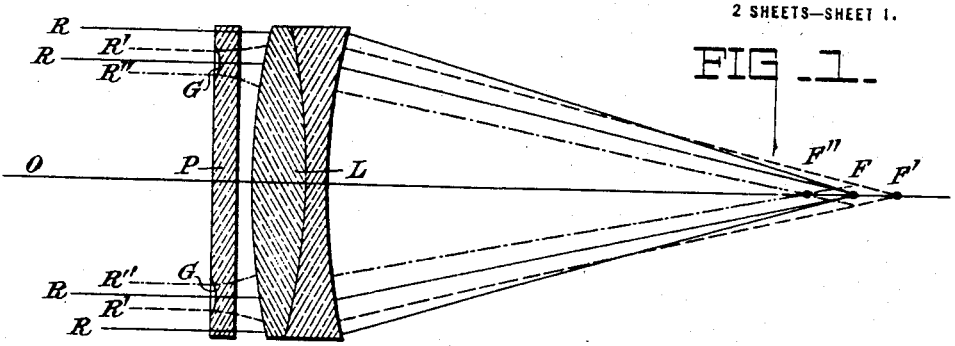
Figure 1 is a diagram used in explaining the principles upon which this invention depends.

Figs. 15 to 18 respectively are sections on an enlarged scale of fragments of different forms;

Fig. 19 is a plan of still another form;

Figs. 20 and 21 are diagrams of optical systems embodying the diffusing element.

The same reference characters are used to indicate similar parts in the several views.

In Fig. 1, L represents diagrammatically a well corrected objective of any type, the axis of which is OF, and which bring to a focus at F rays from a distant axial point. In front of this objective is placed a glass plate P in which are grooves, indicated at G. A series of rays from a distant axial point are indicated by lines. Those rays R which are represented by full lines fall on the plane areas of plate P or upon the bottom of the grooves and pass through the plate P without deviation and are brought to a focus at F. Those rays R' which fall on the curved sides of the grooves farther from the axis are indicated by broken lines and are refracted as shown and impinge the front surface of objective L obliquely away from the axis and are brought to a focus at a point F', beyond F. Those rays R", shown in dotted and dash lines, which fall on the curved sides of the grooves nearer the axis will be refracted as shown and impinge the front surface of objective L obliquely toward the axis and are brought to a focus at F". It is evident that a plane passed through F at right angles to the axis will show a circular instead of a point image.

The diameter of this circle will depend on the maximum refraction of the rays before striking the front surface of the objective and this depends upon the maximum slope of the sides of the grooves. If the grooves are shallow so that the sides have a very slight maximum slope, the amount of diffusion or aberration will be less than if the slope of the walls is greater.

Figure 2:
Figs. 2, 3 and 4 are sections of fragments of differently designed diffusing elements.
Figure 3:
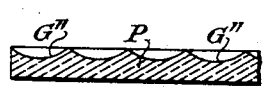
Figure 4:
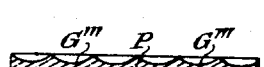

We propose to use as a diffusing element a disk or plate having a large number of such grooves, and the combined effect of these grooves is to produce an image which is more or less diffused. The degree of diffusion may be controlled in various ways. In Fig. 2 is shown a series of grooves G' of a definite width and radius of curvature. The diffusion that would be attained by the use of such a surface would be increased if the same radius of curvature were used but the grooves were wider and deeper as in G", Fig. 3; or by using a smaller radius of curvature with grooves of the same width but deeper, as in G''', Fig. 4.

Figure 5:
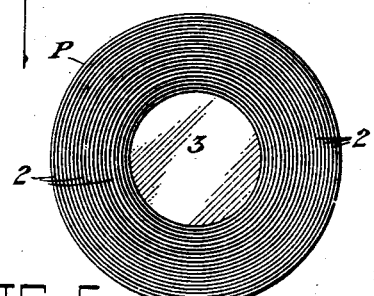
Fig. 5 is a plan of one form of diffusing element.

One form of our diffusing element is shown in Fig. 5 in which is a series of grooves 2, in the form of concentric circles. A plane area 3 is left in the middle of the disk, so that only the marginal rays are diffused. Such an element could readily be made by rotating the disk beneath a rapidly revolving polishing wheel until one groove is ground, then moving the center of the disk relatively to the polishing wheel by the width of a groove and forming another groove. If desired the grooves could be made progressively wider, thus increasing the diffusion progressively toward the margin of the disk. Such a design is shown in Fig. 6, which has a central plane area 3 and concentric grooves 2' of increasing width.

Figure 6:
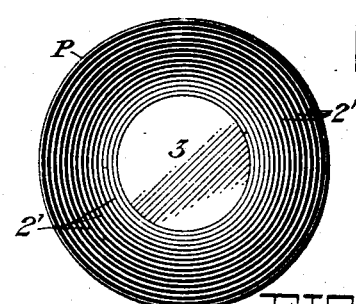
Fig. 6 is a plan of another form.
Figure 7:
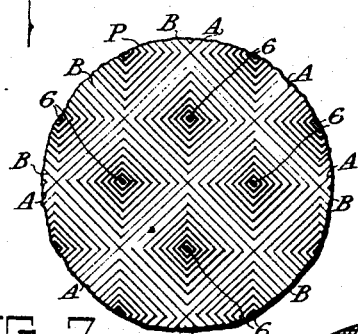
Fig. 7 is a much enlarged plan of a small section of one design of diffusing element.

When only a single series of grooves is used as in Figs. 5 and 6, the diffusion may be greater than is desired, and this may be obviated by forming intersecting series of grooves. As each groove cuts into the wall of every groove it intersects, the wall space having the steeper slope is much reduced compared to the area of gentler slope. This is shown in Fig. 7, where a small area is shown on a much enlarged scale. Grooves having the axial lines A—A, intersect grooves having the axial lines B—B. There are left cusps 6, which rise somewhat like pyramids with concave walls. It is evident that the area having the maximum slope is much less than where only a single series of grooves is used. Referring to Fig. 1, it is evident that the intensity of light in the various parts of the circular image at F will depend on the amount of light refracted to different extents in the plate G. The various designs indicate different ways in which the character of the circular image may be controlled. The form of disk shown in Fig. 5 will produce a more uniformly illuminated circle than that from the intersecting grooves since more light is refracted by the maximum amount and will fall near the periphery of the circular image. The intersecting grooves cause a more intense central illumination of the image and produce more pleasing results. In every event the limit of aberration may be carefully determined and there is no general diffusion or spread of light rays beyond the circle indicated. The aberration or diffusion is thus fully under control and is not a mere haze or general indistinctness cast over the entire image in a haphazard and uncontrolled manner.

Figure 8:
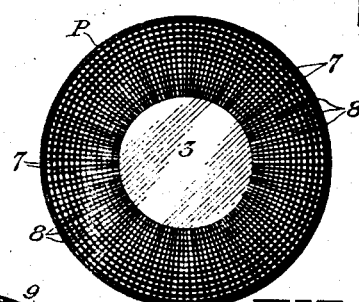
Figs. 8 and 9 are plans of still other designs of diffusing elements.
Figure 9:
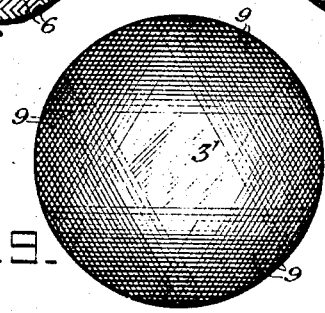

One form embodying intersecting grooves is shown in Fig. 8, in which there is a plane central area 3, a series of concentric grooves 8, preferably of progressively increasing width, and a series of radial grooves 7, intersecting them. The radial grooves may be made of gradually increasing width and depth toward the periphery of the disk as shown. Another design is shown in Fig. 9. Three series of straight parallel grooves 9 intersecting each other at an angle of 120° are here used. In the design shown, the grooves are not made across the plate near its center, thus leaving a hexagonal central plane area 3'; and they may be spaced more widely apart near the periphery of the disk, as shown.

In all of the embodiments described the grooves are very closely spaced and only ridges or cusps lie between adjacent grooves. The grooves may be made on one or both surfaces of the disk, Fig. 10 being a section of a disk grooved on both sides, there being central plane portions 3 and grooves 5 of any desired design on each side.

If desired, the central plane area may be omitted, such a design being shown in Fig. 11, in which two series of grooves, 10 and 11, are shown intersecting at right angles over the whole area of the plate. A fragmentary portion of this design is shown on an enlarged scale in Fig. 12. It will be noted that the grooves are separated leaving plane areas 12. The distance separating adjacent grooves will determine the area left plane and the proportion of rays that will go through the optical system unaffected by the diffusing element. By placing two disks P' of this form face to face, as in Fig. 13, and rotating one relative to the other, the amount of aberration introduced may be varied, being least when the sets of grooves on the two plates are parallel to each other and greatest when they make the greatest angle to each other.

Instead of a series of parallel single grooves separated by plane areas, the grooves may be in separated groups. In Fig. 14 is shown on a large scale a fragment of a surface with series of separated double grooves 13 and 14 intersecting at right angles with plane areas 15 left between the grooves; the width of a plane area being twice the width of the double groove, though this dimension is not a necessary one.

The compound grooves may be made up of grooves of different depth or of different curvature. Cross sections of different designs of grooves are shown in Figs. 15 to 18. In Fig. 15 series of five similar adjacent grooves 16 are ground with intervening plane areas 17. In Fig. 16 the compound groove 18 is formed of three grooves of the same radius of curvature, the grooves being ground so deep and so close together that the walls 19 between the center and outside grooves are lower than the outer walls 20. In Fig. 17 the compound groove is made of two outer grooves 21 and an inner groove 22 of longer radius of curvature. In Fig. 18 the compound groove 23 is shown as made up of a series of grooves of the same radius of curvature but progressively deeper, so that one wall 24 of the resultant compound groove is much steeper than the other, 25, which has a shallow wavelike formation. The effect of this is to deflect the light rays more in one direction than in another. A design in which this groove has been useful is to form three series of grooves intersecting over the whole area of the disk, the angle between the different series being 120°, such a design being shown diagrammatically in Fig. 19.

A distinguishing characteristic of my diffusing elements is that the grooves are carefully formed, preferably by a polishing wheel, and are to be distinguished from indentations made by ruling, etching or other means where the walls are rough and of indeterminate shape. By the word "polished" we mean a smooth wall of determined shape, in contradistinction to one made at haphazard. Because of the control over the curvature of the wall, there is no general diffused or scattered light or haze which merely fogs the entire nature area, reducing contrast and producing a picture that is merely fuzzy; but the rays from each point of the subject are deviated not more than a predetermined extent, so that the character of the reproduced image is controlled and the contrasts are maintained.

The dimensions of the grooves may be varied within wide limits. We have used with a high degree of success grooves having a width of 1 mm. and a radius of curvature of 24 mm. We have also used grooves with a radius of curvature of about 15 mm. and a width of .5 to .75 mm. When plane areas are left between grooves, their size is preferably of the same order of magnitude as the width of the grooves, but the exact relative size is not limited. Different effects may be obtained by varying the design and dimensions. These dimensions are mentioned merely as indicating the order of magnitude of the grooves and we do not in any way limit ourselves to them.

The diffusing element has been used successfully in making copies and enlargements of negatives and drawings; in photographing persons and scenery directly and in projecting drawings and stereopticon and motion picture views for visual inspection. The diffusion permits enlargement and projection on a considerably greater scale than when it is not used, for the grain of a photographic negative is obliterated by it, and the roughness of pencil or ink lines in drawings is softened. Such imperfections as wrinkles, facial blemishes and retouching marks on a negative are also softened in a desirable manner.

When a diffusing element having a plane center or having grooves of different dimensions in different zones is employed, different degrees of aberration may be attained by stopping down with an ordinary diaphragm or by the introduction of a star shaped diaphragm or other form of diaphragm that transmits light differently from different zones. By stopping down to different degrees with a circular diaphragm differing degrees of diffusion may be obtained, until when the diaphragm is as small as the central plane area, there will be no diffusion introduced by the element. In the forms in which the design is uniform over the whole surface of the element, the nature of the diffusion will not be altered by the introduction of the diaphragm. This form, it is obvious, may be used with lenses of different sizes to produce the same kind of diffusion with each, since there are no zonal differences.

A system including a diaphragm is shown diagrammatically in Fig. 20, in which C' and C'' indicate the components of an objective between which is a diaphragm D, and behind which is a diffusing plate P. The diffusing element may be mounted in front of the lens as indicated diagrammatically in Fig. 1; behind it, as in Fig. 20, or between the components of an air spaced objective as in Fig. 21, where C' and C'' are the components and P a diffusing element of any desired design. Ordinarily, however, the element will be in a suitable mount adapted to be easily placed in front of the objective mount.

It is evident that many modifications of our invention are possible and many different designs and dimensions may be employed, to attain different effects, but we contemplate as within the scope of our invention all such equivalents and modifications.

Having thus described our invention, what we claim as new and desire to secure by Letters Patent is:

1. An element designed to introduce into a corrected optical system a determined amount of aberration and comprising a sheet of transparent material having on one surface a symmetrically arranged series of polished indentations therein.

2. An element designed to introduce aberration into a corrected optical system and comprising a sheet of transparent material having on at least one surface a plurality of intersecting series of grooves.

3. An element designed to introduce a determined amount of aberration into a corrected objective and comprising a sheet of transparent refractive material having intersecting series of polished grooves symmetrically arranged thereon.

4. An element designed to introduce a determined amount of aberration into a corrected objective and comprising a sheet of glass having on at least one surface intersecting series of polished grooves of predetermined dimensions symmetrically arranged.

5. An element designed to introduce aberration into a corrected optical system and comprising a sheet of transparent refractive material having on at least one surface a series of polished grooves, a certain proportion of such surface being left plane.

6. An article of manufacture comprising a plate of glass having on at least one surface symmetrically arranged intersecting series of polished grooves of predetermined dimensions, a certain proportion of such surface being left plane, the dimensions of the grooves and of the plane area being so chosen as to introduce a determined amount of aberration into a corrected photographic objective.

Signed at Rochester, New York, this 11th day of November, 1919.

CHARLES W. FREDERICK.
ROY S. HOPKINS.